A. J. LAMB.
TRAVEL INDICATING SIGNAL FOR AUTOMOBILES.
APPLICATION FILED OCT. 4, 1913.
1,164,366.
Patented Dec. 14, 1915.
2 SHEETS—SHEET 1.
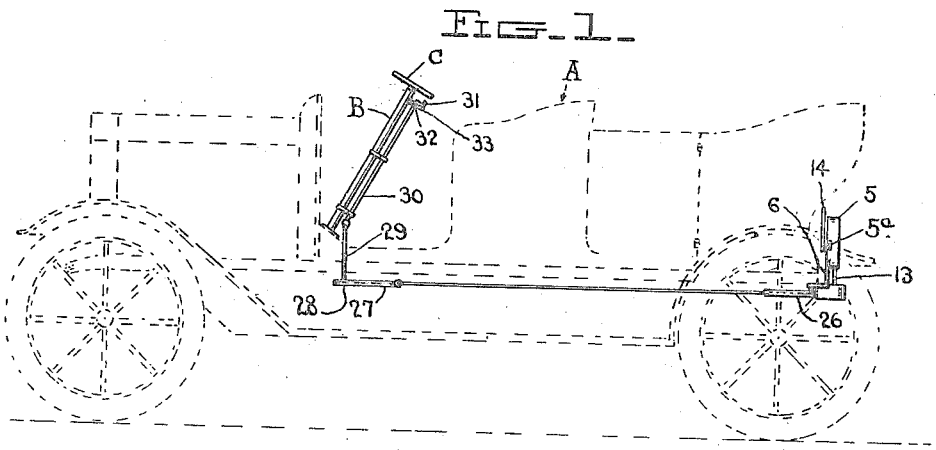
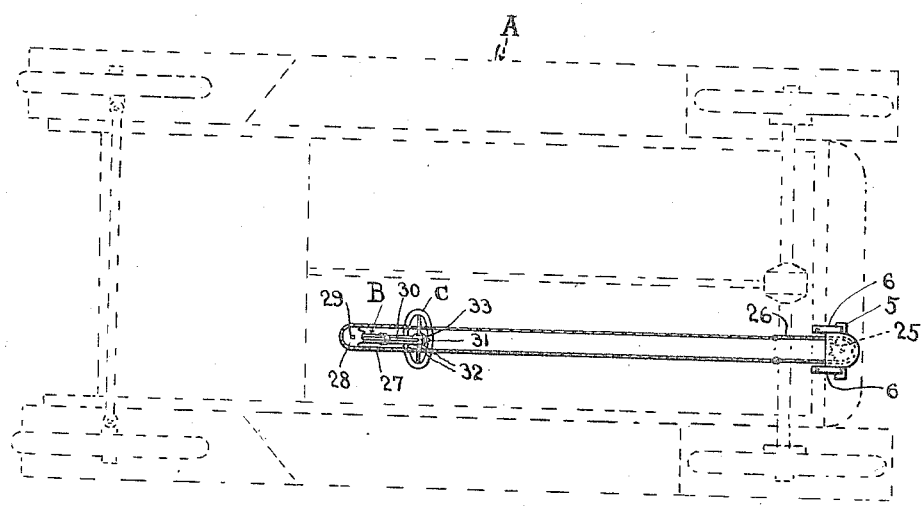
Inventor
Albert J. Lamb
By John Wagner
Attorney
Witnesses
L. B. James
Jos. J. O'Brien A. J. LAMB.
TRAVEL INDICATING SIGNAL FOR AUTOMOBILES.
APPLICATION FILED OCT. 4, 1913.
1,164,366.
Patented Dec. 14, 1915.
2 SHEETS—SHEET 2.
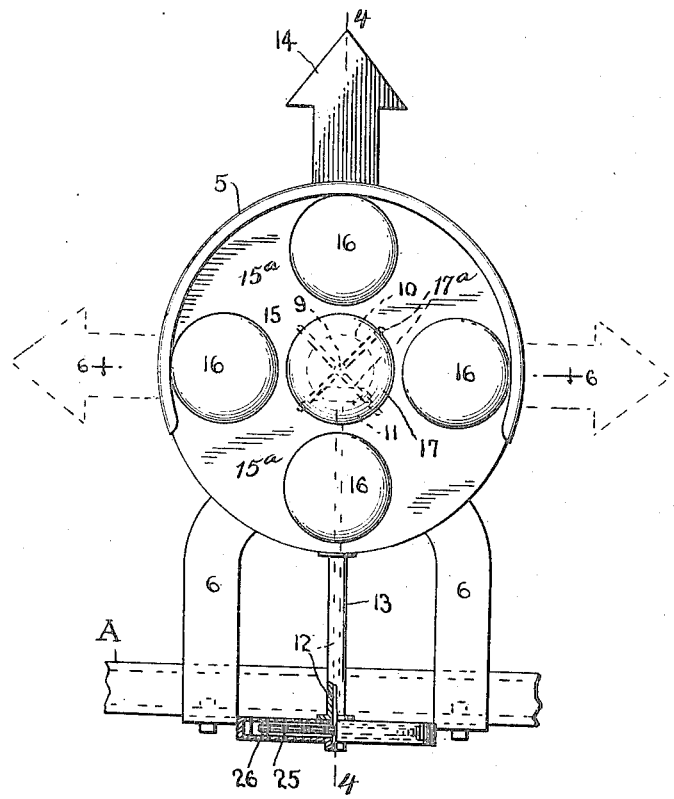
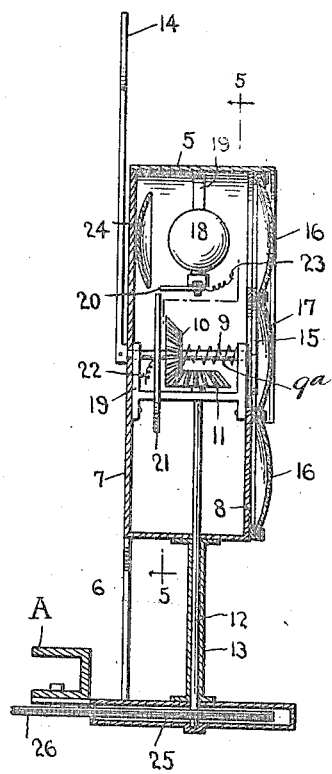
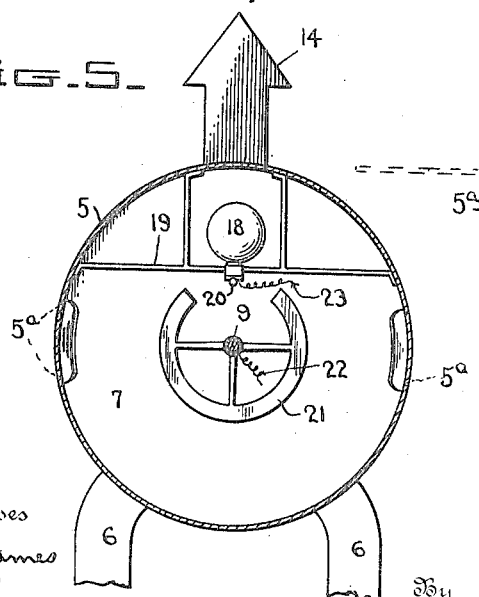
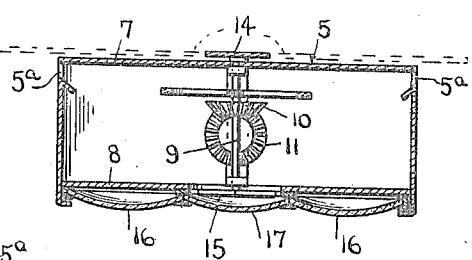
Witnesses
L. B. James
Jos. J. O'Brien
Inventor
Albert J. Lamb
By John Wagner
Attorney

UNITED STATES PATENT OFFICE.

ALBERT J. LAMB, OF BROOKLYN, NEW YORK.

TRAVEL-INDICATING SIGNAL FOR AUTOMOBILES.

1,164,366.   Specification of Letters Patent.   Patented Dec. 14, 1915.

Application filed October 4, 1913. Serial No. 793,457.

*To all whom it may concern:*

Be it known that I, ALBERT J. LAMB, a citizen of the United States, residing at Brooklyn, in the county of Kings and State of New York, have invented certain new and useful Improvements in Travel-Indicating Signals for Automobiles, of which the following is a specification.

This invention relates to improvements in automobile signaling devices and particularly refers to an improved device for indicating the travel of an automobile by means of a movable signal.

One of the objects of the invention is the provision of a device for indicating the direction of travel of an automobile which can be made to signal either in night or in day and can be operated from the steering post.

Another object of the invention is the provision of a device for signaling the direction of travel of an automobile which is provided with a plurality of differently colored glass disks and means for moving the disks in front of a lamp to indicate whether the automobile is going to turn to the right or to the left.

With the above and other objects in view the invention embraces certain combinations, constructions and arrangements of parts, clearly described in the following specification and clearly illustrated in the accompanying drawings, in which:—

Figure 1 is an elevation showing the device applied to an automobile, the automobile being illustrated in light lines. Fig. 2 is a bottom plan view of the automobile and the driving connections for the device. Fig. 3 is an elevation of the signaling device showing the working face thereof. Fig. 4 is a vertical sectional view taken on line 4—4 of Fig. 3. Fig. 5 is a vertical sectional view taken on line 5—5 of Fig. 4. Fig. 6 is a horizontal sectional view taken on line 6—6 of Fig. 3.

Referring to the accompanying drawings illustrating the practical embodiment of the invention A designates an automobile, which may be of any type, and B the usual steering post, carrying the conventional steering wheel C.

The lamp house 5 of the device is supported by means of two spaced brackets 6 on the rear of the automobile. The lamp house is provided with a rear wall 7 and a front wall 8. A shaft 9 is journaled centrally on said rear and front walls, and said shaft carries a bevel gear 10, which gear meshes with a second bevel gear 11, carried by the vertical shaft 12, which extends through a stationary tube 13 serving to support the lamp house and secured to its base at the upper end thereof.

On the rear end of the shaft 9 an indicating hand 14 is secured, which is adapted to project above or laterally of the lamp house so as to be easily seen rearwardly of the automobile. The hand 14 moves behind the rear wall of the lamp house and the lamp house is provided with side openings 5ª so that the tip of the hand will be illuminated when turned either to the right or left horizontal positions.

On the outer end of the shaft 9 a metal disk 15 is secured. This disk carries a plurality of glass blocks 16, suitably secured thereto in openings provided in the disk 15. I prefer to employ three glass blocks, two of which are colored green or any other desirable color, and one of which is colored orange or yellow, or any other desirable color. Normally the disk 15 is so arranged that the yellow or orange block will be lowermost and the blocks of like color will be in horizontal position opposite each other. The green blocks are spaced apart from each other to provide a space 15ª, which is not adapted to permit light to pass therethrough, being non-transparent, and may be painted white or any other mild color. The central portion of the disk 15 is provided with an opening in which a red colored glass block 17 is disposed, said block 17 being attached by the radial arms 17ª to the shaft 9. A suitable illuminating device is arranged within the house 5 to project light rays on the red glass block 17.

Within the lamp house 5 a lamp 18 is supported on a bracket 19, which is secured to the lamp house and carries on its free end the usual electric lamp socket. The bracket 19 is provided with a detachable contact brush 20 which is adapted to engage the C-shaped contact strip 21, which is arranged on the shaft 9 and is adapted to travel therewith. The contact strip 21 is connected with a current wire 22 and the brush 20 is connected with a current wire 23, both wires having suitable supply connection, whereby the circuit through the lamp will be maintained.

A reflector 24 is located behind the lamp 18 and is adapted to reflect the light rays upon the glass block 16 located adjacent the opening opposite the lamp, and also to reflect the light rays upon the red glass located centrally of the disk 15.

The lower end of the vertical shaft 12 is provided with a sprocket 25 over which a sprocket chain 26 operates. The ends of the chain 26 are connected to the ends of a second sprocket chain 27, which operates over the sprocket wheel 28 located under the forward part of the automobile. The sprocket 28 is secured to the lower end of the rod 29, which extends upwardly and has a universal connection with the rod 30 which is mounted on the steering post for rotary movement. The upper end of the rod 30 is provided with an operating arm or handle 31 which is adapted to engage the notches 32 in the ring 33, so that the action of the device may be accurately controlled.

By turning the rods 30 and 29 motion will be transmitted to the chains 26 and 27 and to the vertical shaft 12 and through the meshing bevel gears to the horizontal shaft 9. The normal position of the glass blocks corresponds with the position of the notches in the ring 33, so that by turning the arm or handle 31 the position of the glass blocks may be varied. When it is desired to turn to the right the rods are operated so the chains transmit motion to the shafts 12 and 9, bringing the right green glass block to a position opposite the lamp 18 and the hand 14 to a horizontal position, to be illuminated by the light passing through the side openings in the lamp house. An opposite movement will indicate the left turn. When it is desired to completely reverse the direction of travel or turn around the yellow or orange glass is brought into a position opposite the lamp 18. A helical spring 9ª is arranged on the shaft 9 so as to return it to normal position. When the shaft 9 is actuated the spring 9ª will be placed under tension and will react to return the shaft to normal position when the operator releases his control from the operating handle.

By means of the improved travel indicating signal a driver can readily signal his direction of travel so as to avoid collisions. The device can be readily applied to any make of automobile and various changes in the location of parts, the construction of details may be resorted to without departing from the spirit of the invention.

Normally the current is cut-out through the lamp and when the disk is rotated the circuit through the lamp is closed, by reason of the engagement of the C-shaped contact strip thereof with the contact brush.

Having described my invention I claim:—

1. A travel indicating signal for automobiles consisting of a lamp house adapted to be secured to the automobile, said lamp house having a rear wall provided with an opening, an illuminating device located in said house to project light rays through the opening, a shaft journaled on said lamp house, a disk secured on said shaft, transparent blocks carried by the disk and of like color and located in opposing relation to each other on said disk, a transparent block located on said disk and of a color unlike that of the first blocks, a contact member supporting in said lamp house and in circuit with the illuminating device, a C-shaped contact member supported on the shaft and adapted to make and break contact with the contact member and in circuit with the illuminating device, and means to rotate the shaft to simultaneously illuminate the illuminating device and to bring either one of the like colored blocks into registration with the opening in the lamp house.

2. A travel indicating signal for automobiles consisting of a lamp house, means for attaching the house to the end of an automobile, an end wall on said house having a single light opening, a lamp in said house in line with the opening, a disk rotatable against said end wall, transparent blocks of like color located on said disk in opposite relation to each other, a transparent block of a color unlike the first blocks located on said disk between the first blocks, said lamp house having a side opening, a hand movable on said house to come into line with the side opening, and means for simultaneously moving the hand, rotating the disk and energizing the lamp adapted to be manually operated from the front end of the automobile.

In testimony whereof I affix my signature in presence of two witnesses.

ALBERT J. LAMB.

Witnesses:
  J. D. YOAKLEY,
  JOSEPH J. O'BRIEN.